United States Patent Office 3,477,901

Patented Nov. 11, 1969

3,477,901

COMPOSITIONS AND PROCESSES FOR ADHERING POLYOLEFINS TO SURFACES

Joseph W. Keil, Midland, Mich., assignor to Dow Corning Corporation, Midland, Mich., a corporation of Michigan No Drawing. Filed May 10, 1963, Ser. No. 279,592

Int. Cl. B32b *13/12;* C09j *3/00*

U.S. Cl. 161—208 15 Claims

This invention relates to compositions and processes for adhering polyolefins to various surfaces.

Prior attempts to bond polyolefins to various surfaces have been unsuccessful, not only because the initial bond strength between the polyolefin and the substrate is low, but in particular because the hydrolytic stability of the bond is very poor.

It has been found in accordance with this invention that when certain compositions are applied to the substrate to which the polyolefin is to be bonded, not only is the initial bond strength increased, but also the hydrolytic stability of the bond is increased markedly.

More particularly, applicant has discovered a process for adhering a polyolefin to a substrate which comprises applying to the substrate a composition in liquid form consisting essentially of a mixture of (1) a silane having the general formula

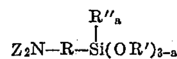

wherein:

R is a divalent hydrocarbon radical free of aliphatic unsaturation and containing at least 3 carbon atoms, Z is a member selected from the group consisting of hydrogen atoms and substituted monovalent hydrocarbon groups containing at least one $H_2N$-group and being free of aliphatic unsaturation, R′ is a member selected from the group consisting of alkyl groups containing 1 to 4 carbon atoms, and the $—CH_2CH_2OH$, $—CH_2CH_2OCH_3$ and $—CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Z_2N—$ group is attached to at least the third carbon atom removed from the silicon atom, and (2) a member selected from the group consisting of monocarboxylic acids and silanes having the general formula $R'''Si(OR')_3$ wherein R‴ is a member selected from the group consisting of alkyl groups containing 1 to 18 carbon atoms and the phenyl group and R′ is as defined above, drying the substrate and bonding the polyolefin to the substrate.

Applicant has also discovered a process for adhering a polyolefin to a substrate which comprises applying to the substrate a composition in liquid form consisting essentially of a mixture of (1) a silane having the general formula

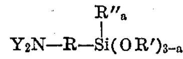

wherein:

R is a divalent hydrocarbon radical free of aliphatic unsaturation and containing at least 3 carbon atoms, Y is a member selected from the group consisting of hydrogen atoms, amino-substituted monovalent hydrocarbon groups free of aliphatic unsaturation and monovalent hydrocarbon groups, R′ is a member selected from the group consisting of alkyl groups containing 1 to 4 carbon atoms, and the $—CH_2CH_2OH$, $—CH_2CH_2OCH_3$ and $—CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Y_2N—$ group is attached to at least the third carbon atom removed from the silicon atom, and (2) sodium monomethylsiliconate, drying the substrate and bonding the polyolefin to the substrate.

It has further been found in accordance with this invention that the following compositions are useful for adhering polyolefins to various substrates and forming a hydrolytically stable bond:

(A) A composition consisting essentially of (1) a silane having the general formula

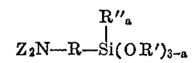

wherein:

R is a divalent hydrocarbon group free of alphatic unsaturation and containing at least 3 carbon atoms, Z is a member selected from the group consisting of hydrogen atoms and substituted monovalent hydrocarton groups containing at least one $H_2N—$ group and being free of aliphatic unsaturation, R′ is a member selected from the group consisting of alkyl groups containing 1 to 4 carbon atoms, and the $—CH_2CH_2OH$, $—CH_2CH_2OCH_3$ and $—CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive and the $Z_2N—$ group is attached to at least the third carbon atom removed from the silicon atom, and (2) a silane having the general formula $R'''Si(OR')_3$ wherein R‴ is a member selected from the group consisting of alkyl groups containing 1 to 18 carbon atoms and the phenyl group, and R′ is as above defined.

(B) A composition consisting essentially of (1) a silane having the general formula

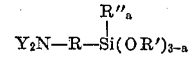

wherein:

Y is a member selected from the group consisting of hydrogen atoms, amino-substituted monovalent hydrocarbon groups free of aliphatic unsaturation and monovalent hydrocarbon groups, R, R′, R″ and *a* are as defined above and the $Y_2N—$ group is attached to at least the third carbon atom removed from the silicon atom, and (2) sodium monomethylsiliconate.

In the above formulae, for example, R can be any divalent hydrocarbon radical free of aliphatic unsaturation such as $—CH_2CH_2CH_2—$, $—CH_2CH_2CH_2CH_2—$, $—CH_2CH(CH_3)CH_2—$ $—CH_2CH_2CH(CH_3)CH_2—$,

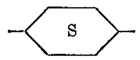

cyclopentylene, $—CH_2CH_2CH_2CH_2CH_2—$, $—C_{18}H_{36}—$ or $—C_6H_4—$; Z can be (in addition to hydrogen)

$H_2NCH_2CH_2—$ $H_2NCH_2CH_2CH_2—$, $H_2NCH(CH_3)CH_2—$, $H_2N[CH_2CH_2NH]_3CH_2CH_2—$ $H_2NCH_2CH_2CH_2CH_2CH_2—$, $H_2NC_6H_4—$ or an aminotolyl group; R' can be a methyl, ethyl, propyl, isopropyl, butyl, isobutyl, $—CH_2CH_2OH$, $—CH_2CH_2OCH_3$ or $—CH_2CH_2OCH_2CH_3$ group; R'' can be any monovalent hydrocarbon group or fluorinated monovalent hydrocarbon group free of aliphatic unsaturation such as a methyl, ethyl, propyl, isopropyl, butyl, isobutyl, pentyl, octyl, decyl, dodecyl, octadecyl, phenyl, tolyl, benzyl, xenyl, naphthyl, cyclohexyl, cyclopentyl, $CF_3CH_2CH_2—$, $CF_3CF_2CH_2CH_2—$ $C_7H_{15}CH_2CH_2—$, $(CF_3)_2CFCH_2CH_2—$, $(CF_3)_2CHCH_2CH_2—$ or $CF_3C_6H_4—$ group; R''' can be phenyl or an alkyl group such as methyl, ethyl, propyl, isopropyl, butyl, isobutyl, pentyl, hexyl, heptyl, octyl, decyl, dodecyl or an octadecyl and Y can be any amino-substituted hydrocarbon group such as the groups mentioned for Z above, and any monovalent hydrocarbon group such as methyl, ethyl, propyl, isopropyl, amyl, vinyl, allyl, octadecyl, cyclohexyl, phenyl, xenyl, tolyl or a benzyl group.

With respect to the first process set forth above, the relative proportion of the silane (1) and the compound (2) will vary depending on the particular compound selected from (2). Generally speaking, when (2) is a monocarboxylic acid, the amount of acid employed can range from one-third the stoichiometric amount needed to form the salt of the amino compound to 3 times the stoichiometric amount needed to form the salt. It is preferred, however, that the amount of acid be in the range from the stoichiometric amount to twice the stoichiometric amount. When (2) is a silane the mole ratio of (1) to (2) should be in the range of 2:1 to 1:3 and preferably in the range of 1:1 to 1:2. A mixture of an acid and the silane can also be used when this is done the ratio of each to (1) as set forth above should still be maintained.

In the composition (B) the relative proportion of (1) to (2) should be such that the mole ratio of (1) to (2) is in the range from 1:1 to 10:1 and preferably from 1:1 to 7:1. The sodium monomethylsiliconate can have a Na:Si ratio from about 1:1 to 3:1 but the preferred material is that having a Na:Si ratio of about 1:1.

The preferred composition to be employed in the processes of this invention is a composition consisting essentially of 1 mole of $H_2NCH_2CH_2NHCH_2CH_2CH_2Si(OCH_3)_3$ and 3 moles of acetic acid. Other preferred compositions are: a composition consisting essentially of 1 mole of $H_2NCH_2CH_2NHCH_2CH_2CH_2Si(OCH_3)_3$ and 1 mole of $CH_3Si(OCH_3)_3$; a composition consisting essentially of 1 mole of $H_2NCH_2CH_2NH(CH_2)_3Si(OCH_3)_3$ and 1 mole of $C_3H_7Si(OCH_3)_3$; a composition consisting essentially of 1 mole of $H_2NCH_2CH_2NHCH_2CH_2CH_2Si(OCH_3)_3$, 1 mole of $CH_3Si(OCH_3)_3$ and 3 moles of acetic acid. The preferred composition falling within the scope of composition (B) is a composition consisting essentially of 1 mole of $H_2NCH_2CH_2NHCH_2CH_2CH_2Si(OCH_3)_3$ and 1 mole of sodium monomethylsiliconate having a Na:Si ratio of about 1:1.

The compositions of this invention are applied to the substrate or the polyolefin in liquid form in any convenient manner. By the term "in liquid form" it is meant that when the compositions per se are liquids they can be applied directly to the substrate or the compositions can be applied from a solvent solution whether they are liquids or solids. Preferably, the compositions are applied to the substrate in the form of a solvent solution employing any of the conventional techniques such as wiping, brushing or spraying.

Any solvent can be employed that has no deleterious affect on the substrate or composition. Illustrative of the solvents that can be used are methyl alcohol, ethyl alcohol, propyl alcohols, butyl alcohols, hexane, heptane, naphtha mineral spirits, Stoddard solvent, toluene, perchloroethylene and water. Of these, isopropyl alcohol is the preferred solvent with a mixture of isopropyl alcohol and another solvent being next preferred. The compositions of this invention are employed in a concentration of about 0.1 to 10 percent by weight of the solvent and preferably in a concentration of about 1 to 5 percent.

The compositions of this invention are applied to the substrate to which the polyolefin is to be bonded or to the polyolefin or to both and then dried. The polyolefin is then laminated to the substrate by employing heat and pressure. Many suitable devices are avalaible which can be used for laminating the polyolefin to the substrate and are well known to those skilled in the art. The particular temperature and pressure employed will depend on the substrate and the polyolefin being bonded thereto.

The polyolefins can be bonded to any solid substrate such as metals, ceramics, siliceous or organic substrates employing the compositions of this invention. One might mention by way of illustration cellophane (cellulose sheets), Saran coated cellophane (Saran is copolymer of vinyl chloride and vinylidene chloride), Mylar (an ethylene glycol-terephthalate polyester), auminum foil, glassine paper, silicone treated parchment paper, cotton cloth, glass, ceramic tile, etc. In some instances, such as with Mylar and cellophane, the polyolefin must be laminated to both sides of the substrate, otherwise the substrate tends to swell, breaking the bond between the composition and substrate.

Any polyolefin can be adhered to the substrates employing the compositions of this invention. Specific examples of operative polyolefins are polyethylene, polystyrene, polypropylene, polyethylene-butylene copolymers, polyisoprene and butadiene-styrene copolymers.

In order that those skilled in the art can better understand how the present invention can be practiced, the following examples are given by way of illustration and not by way of limitation.

EXAMPLE 1

A one percent solution of the compositions set forth in Table I were prepared and applied to the substrate with a Kimwipe tissue. The materials were then allowed to air dry for 30 minutes. Then a two mil polyethylene film was laminated to the substrate with a Carver press. The temperature and pressure of the press varied with the substrate. The bond strength between the polyethylene film and the substrate was measured initially and after the laminate had been exposed for 24 hours to an atmosphere having a relative humidity of 100 percent. This was done to determine the hydrolytic stability of the bond. The strength of the bond was measured by pulling the polyethylene film from one such strip of the laminate on a Keil Tester at an angle of 180° to the surface of the substrate at a rate of 12 inches per minute. The force required to do this was determined by means of a spring balance and is expressed in grams per inch width of tape.

The Keil Tester is described in TAPPI, vol. 43, No. 8, pages 164A and 165A (August 1960).

The glassine paper and cotton cloth laminates were prepared by molding for 10 seconds at a temperature of 160° C. and 2000 p.s.i. of pressure. All the other laminates were prepared by molding for 10 seconds at a temperature of 200° C. and 5000 p.s.i. The cellophane and Mylar substrates were coated on both sides with the polyethylene film. Under each substrate the initial bond strength is listed in the left hand column while the bond strength after 24 hours at 100 percent relative humidity is listed in the right hand column. The bond strengths are given in grams per inch.

EXAMPLE 3

A 1 percent solution of the compositions set forth in Table III below were prepared in isopropyl alcohol and applied to Saran coated cellophane. Then a film of polyethylene was bonded to the Saran coated cellophane as in Example 1. The bond strength between the polyethylene film and Saran coated cellophane was measured initially after the laminate had been immersed in 80° C. water for 10 minutes and after the laminate had been exposed to a relative humidity of 100 percent for 24 hours. The results are set forth in the table below.

TABLE I.—ADHESION OF POLYETHYLENE TO VARIOUS SUBSTRATES

| | Solvent | Cellophane | | Saran-coated Cellophane | | Mylar | | Aluminum foil | | Glassine paper | | Silicone treated parchment | | Cotton cloth | |
|---|---|---|---|---|---|---|---|---|---|---|---|---|---|---|---|
| Control | | <50 | <50 | <50 | <50 | <50 | <50 | >500 | <50 | <50 | <50 | <50 | <50 | >500 | >500 |
| Composition: | | | | | | | | | | | | | | | |
| 1 mol $H_2NCH_2CH_2NH(CH_2)_3Si(OCH_3)_3$, 1 mol sodium monomethylsiliconate Na:Si~1:1. | Isopropyl alcohol and water. | | | >500 | 350 | | | | | >500 | 450 | | | >500 | >500 |
| 9 mols $H_2NCH_2CH_2NH(CH_2)_3Si(OCH_3)_3$, 1 mol sodium monomethylsiliconate Na:Si~1:1. | do | | | 500 | 250 | | | | | | | | | | |
| 1 mol $H_2NCH_2CH_2NH(CH_2)_3Si(OCH_3)_3$, 1 mol acetic acid. | Isopropyl alcohol. | | | 500 | 250 | | | | | | | | | | |
| 1 mol $H_2NCH_2CH_2NH(CH_2)_3$- | do | >500 | >500 | >500 | 300 | >500 | >500 | >500 | >500 | 450 | 475 | >500 | 400 | >500 | >500 |
| 1 mol $H_2NCH_2CH_2NH(CH_2)_3Si(OCH_3)_3$, 5 mols acetic acid. | do | | | >500 | 200 | | | | | | | | | | |
| 1 mol $H_2NCH_2CH_2NH(CH_2)_3Si(OCH_3)_3$, 3 mols acetic acid. | Isopropyl alcohol and water. | | | >500 | 250 | | | | | | | | | | |
| 1 mol $H_2NCH_2CH_2NH(CH_2)_3Si(OCH_3)_3$, 3 mols acetic acid. | Water | | | >500 | 200 | | | | | | | | | | |
| 1 mol $H_2NCH_2CH_2NH(CH_2)_3Si(OCH_3)_3$, 1 mol $CH_3Si(OCH_3)_3$. | Isopropyl alcohol. | | | 150 | 150 | | | >500 | 250 | 450 | 300 | >500 | >500 | >500 | >500 |
| 1 mol $H_2NCH_2CH_2NH(CH_2)_3Si(OCH_3)_3$, 1 mol oleic acid. | Isopropyl alcohol and water. | | | >500 | 100 | | | >500 | >500 | | | | | | |
| 1 mol $H_2NCH_2CH_2NH(CH_2)_3Si(OCH_3)_3$, 1 mol benzoic acid. | do | | | >500 | 150 | | | >500 | >500 | | | | | | |
| mol $H_2NCH_2CH_2NHCH_2CH(CH_3)CH_2Si(OCH_3)_3$, 3 mols acetic acid. | Isopropyl alcohol. | | | >500 | 300 | | | | | | | | | | |
| 1 mol $H_2N(CH_2)_3Si(OC_2H_5)_3$, 2 mols acetic acid. | do | | | >500 | 500 | | | | | | | >500 | 300 | | |
| 1 mol $(CH_3)_2N(CH_2)_3Si(OCH_3)_3$, 1 mol sodium monomethylsiliconate Na:Si~1:1. | Isopropyl alcohol and water. | | | 300 | | | | | | | | | | | |
| 1 mol $H_2NCH_2CH_2NH(CH_2)_3Si(OCH_3)_3$, 1 mol $CH_3Si(OCH_3)_3$, 3 mols acetic acid. | Isopropyl alcohol. | | | >500 | 150 | | | | | | | | | | |

EXAMPLE 2

A composition consisting essentially of 1 mol of $$H_2NCH_2CH_2NH(CH_2)_3Si(OCH_3)_3$$

and 3 moles of acetic acid was prepared. A 1 percent solution of this composition in isopropyl alcohol was then prepared and applied to the substrates set forth in Table II below with a Kimwipe. Then a film of polyethylene was bonded to the substrates as in Example 1. The bond strength between the polyethylene film and the substrate was measured initially and after the laminate had been immersed in boiling water for 5 minutes. The bond strength was measured as in Example 1 and the results are set forth in Table II.

TABLE II

| Substrate | Force Required to Break bond (g./in.) Initial | 5 min. in boiling water |
|---|---|---|
| Silicone treated parchment | 400 | 250 |
| Saran-coated cellophane | >500 | 350 |
| Glassine paper | 400 | 400 |
| Cotton cloth | >500 | >500 |
| Aluminum foil | >500 | 100 |
| Cellophane | >500 | >500 |
| Mylar | >500 | 300 |

TABLE III

| Composition | Force Required to Break Bond (g./m.) Initial | 10 min. 80° C. water | 24 hrs. at 100% R.H. |
|---|---|---|---|
| 1 mole $H_2NCH_2CH_2NH(CH_2)_3Si(OCH_3)_3$, 1 mole $CH_3Si(OCH_3)_3$ | >500 | 100 | 125 |
| 1 mole $H_2NCH_2CH_2NH(CH_2)_3Si(OCH_3)_3$, 1 mole $C_3H_7Si(OCH_3)_3$ | >500 | 300 | 350 |
| 1 mole $H_2NCH_2CH_2NH(CH_2)_3Si(OCH_3)_3$, 1 mole $C_6H_{13}Si(OCH_3)_3$ | >500 | 100 | 100 |
| 1 mole $H_2NCH_2CH_2NH(CH_2)_3Si(OCH_3)_3$. 1 mole $C_{12}H_{25}Si(OCH_3)_3$ | >500 | 200 | 175 |
| 1 mole $H_2NCH_2CH_2NH(CH_2)_3Si(OCH_3)_3$, 1 mole $C_6H_5Si(OCH_3)_3$ | >500 | 250 | 350 |

EXAMPLE 4

When the compositions set forth in Table IV below are used instead of the compositions of Example 1, good adhesion of the polyethylene film to the substrate is obtained:

TABLE IV

| Composition | Concentration, Percent | Solvent |
|---|---|---|
| 1 mol $H_2NCH_2CH_2NH(CH_2)_3Si(OC_3H_7)_3$, 3 mols acetic acid. | .1 | Isopropyl alcohol. |
| 1 mol $H_2NCH(CH_3)CH_2NH(CH_2)_3Si(OCH_3)_3$, 3 mols acetic acid. | .25 | Do. |
| 1 mol $H\overset{CH_3}{\overset{\vert}{N}}(CH_2)_3Si(OCH_3)_3$, 1 mol sodium monomethylsiliconate, Na:Si~1:1. | 2 | Isopropyl alcohol and water. |
| 1 mol $H_2N(CH_2)_3Si(OCH_2CH_2OCH_3)_3$, 1 mol $C_7H_{15}Si(OCH_3)_3$, 2 mols acetic acid. | 5 | Do. |
| 1 mol $H_2NCH_2CH_2NH(CH_2)_3Si(OCH_2CH_2OH)_3$, 3 mols propionic acid. | .5 | Do. |
| 1 mol $H_2NCH_2CH_2NH(CH_2)_3\overset{CH_3}{\overset{\vert}{Si}}(OCH_3)_2$, 3 mols formic acid. | 1 | Isopropyl alcohol and toluene. |
| 1 mol $H_2N(CH_2)_4Si(OC_2H_5)_3$, 1 mol $C_2H_5Si(OC_2H_5)_3$. | 1.5 | Isopropyl alcohol |
| 1 mol $(CH_3)_2NCH_2CH_2NH(CH_2)_3Si(OCH_3)_3$, 1 mol sodium monomethylsiliconate, Na:Si~1:1. | 8.75 | Isopropyl alcohol and water. |
| 1 mol $H_2NCH_2CH_2NH(CH_2)_3\overset{(CH_3)_2}{\overset{\vert}{Si}}OCH_3$, 3 mols 2-ethylhexanoic acid. | 3 | Do. |
| 1 mol $H\overset{CH_3}{\overset{\vert}{N}}(CH_2)_3\overset{(CH_3)_2}{\overset{\vert}{Si}}OCH_3$, 1 mol sodium monomethylsiliconate Na:Si~1:1. | 1 | Do. |
| 1 mol $(CH_3)_2N(CH_2)_3\overset{CH_2CH_2CF_3}{\overset{\vert}{Si}}(OCH_3)_2$, 1 mol sodium monomethylsiliconate, Na:Si~1:1. | 2 | Do. |
| 1 mol $H_2NCH(CH_3)CH_2NHCH_2CH(CH_3)CH_2Si(OCH_3)_3$, 3 mols acetic acid. | 1 | Isopropyl alcohol. |
| 1 mol $H_2NCH_2CH_2NH(CH_2)_3\overset{CH_2CH_2CF_3}{\overset{\vert}{Si}}(OCH_3)_2$, 1 mol $C_5H_{11}Si(OCH_3)_3$. | .75 | Do. |

EXAMPLE 5

When the compositions of Example 1 are employed for adhering polypropylene, polystyrene, polyisoprene, butadiene-styrene copolymers, polyethylene-butylene copolymers to the various substrates, good adhesion is obtained.

EXAMPLE 6

When the compositions set forth in Table V below are employed instead of the compositions of Example 1, good adhesion of the polyethylene film to the substrate is obtained.

1 mole $H_2NC_6H_4\overset{C_6H_5}{\overset{\vert}{Si}}(OCH_3)_2$
2 moles acetic acid 1 mole $H_2NC_6H_{10}\overset{C_6H_4CF_3}{\overset{\vert}{Si}}(OCH_3)_2$
2 moles acetic acid 1 mole $H_2NC_6H_4NH(CH_2)_4\overset{C_6H_4C_2H_5}{\overset{\vert}{Si}}(OCH_3)_2$
1 mole $C_4H_9Si(OC_3H_7)_3$ 1 mole $(H_2N)(CH_3)C_6H_2NH(CH_2)_3\overset{C_6H_{11}}{\overset{\vert}{Si}}(OCH_3)_2$
1 mole $C_8H_{17}Si(OCH_3)_3$ 1 mole $H_2NC_6H_4CH_2NH(CH_2)_3\overset{C_6H_4F}{\overset{\vert}{Si}}(OCH_3)_2$
3 moles propanoic acid 1 mole $H_2NC_6H_{10}NHCH_2CH(CH_3)CH_2\overset{CH_2C_6H_5}{\overset{\vert}{Si}}(OCH_3)_2$
4 moles acetic acid 1 mole $H_2N(CH_2)_5NH(CH_2)_3\overset{C_6H_{10}F}{\overset{\vert}{Si}}(OC_2H_5)_2$
6 moles acetic acid 1 mole $H_2NCH(CH_3)CH_2NH(CH_2)_3\overset{CH_2CH(C_6H_5)CF_3}{\overset{\vert}{Si}}(OC_4H_9)_2$
1 mole $C_{18}H_{37}Si(OCH_3)_3$ 1 mole $(C_6H_5)HN(CH_2)_3Si(OCH_3)_3$
1 mole sodium monomethylsiliconate 1 mole $(CH_3C_6H_4)HN(CH_2)_4\overset{C_6H_4CF_3}{\overset{\vert}{Si}}(OCH_3)_2$
1 mole sodium monomethylsiliconate 2 moles $(C_6H_5CH_2)HN(CH_2)_3Si(OCH_3)_3$
1 mole sodium monomethylsiliconate 1 mole $(C_6H_{11})HN(CH_2)_3Si(OCH_3)_3$
1 mole sodium monomethylsiliconate 1 mole $(C_6H_9)HN(CH_2)_3Si(OCH_3)_3$
1 mole sodium monomethylsiliconate 5 moles $(CH_2{=}CHCH_2)HN(CH_2)_3\overset{CH_3}{\overset{\vert}{Si}}(OCH_3)_2$
1 mole sodium monomethylsiliconate 1 mole $HC{\equiv}CCH_2CH_2NH(CH_2)_3Si(OCH_3)_3$
1 mole sodium monomethylsiliconate That which is claimed is:

1. A process for adhering a polyolefin to a substrate which comprises applying to the substrate a composition in liquid form consisting essentially of a mixture of:

(1) a silane having the general formula $$Z_2N{-}R{-}\overset{R''_a}{\overset{\vert}{Si}}(OR')_{3-a}$$

wherein:

R is a divalent hydrocarbon radical free of aliphatic unsaturation and containing at least 3 carbon atoms, Z is a member selected from the group consisting of hydrogen atoms and substituted monovalent hydrocarbon groups containing at least one $H_2N$-group and being free of aliphatic unsaturation, R′ is a member selected from the group consisting of alkyl groups containing 1 to 4 carbon atoms, and the $-CH_2CH_2OH$, $-CH_2CH_2OCH_3$ and $-CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Z_2N$— group is attached to at least the third carbon atom removed from the silicon atom, and (2) silanes having the general formula $R'''Si(OR')_3$ wherein R‴ is a member selected from the group consisting of alkyl groups containing 1 to 18 carbon atoms and the phenyl group and R′ is as defined above, and the mole ratio of (1) to (2) being in the range of 2:1 to 1:3, drying the substrate and bonding the polyolefin to the substrate.

2. The process of claim 1 wherein (1) is selected from the group consisting of $$H_2NCH_2CH_2NH(CH_2)_3Si(OCH_3)_3$$

and (2) is $CH_3Si(OCH_3)_3$, $C_3H_7Si(OCH_3)_3$ and $$C_6H_5Si(OCH_3)_3$$

(1) and (2) being present in equimolar amounts.

3. The process of claim 2 wherein the polyolefin is polyethylene, the substrate is Saran coated cellophane and the composition is applied to the substrate as a solution in isopropyl alcohol.

4. The process of claim 1 wherein (1) is $$H_2NCH_2CH_2NH(CH_2)_3Si(OCH_3)_3$$

and (2) is a mixture of $CH_3Si(OCH_3)_3$ and acetic acid, the mole ratio of (1) to $CH_3Si(OCH_3)_3$ being about 1:1 and the mole ratio of (1) to the acid being about 1:3.

5. A process for adhering a polyolefin to a substrate which comprises applying to the substrate a composition in liquid form consisting essentially of a mixture of (1) a silane having the general formula $$Y_2N{-}R{-}\overset{R''_a}{\overset{|}{Si}}(OR')_{3-a}$$

wherein:

R is a divalent hydrocarbon radical free of aliphatic unsaturation and containing at least 3 carbon atoms, Y is a member selected from the group consisting of hydrogen atoms, amino-substituted monovalent hydrocarbon groups free of aliphatic unsaturation and monovalent hydrocarbon groups, R′ is a member selected from the group consisting of alkyl groups containing 1 to 4 carbon atoms, and the $-CH_2CH_2OH$, $-CH_2CH_2OCH_3$ and $-CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Y_2N-$ group is attached to at least the third carbon atom removed from the silicon atom, and (2) sodium monomethylsiliconate, drying the substrate and bonding the polyolefin to the substrate.

6. The process of claim 5 wherein (1) is selected from the group consisting of (a) $H_2NCH_2CH_2NH(CH_2)_3Si(OCH_3)_3$ (b) $H_2NCH_2CH_2NHCH_2CH(CH_3)CH_2Si(OCH_3)_3$ and (c) $H_2N(CH_2)_3Si(OC_2H_5)_3$ (d) $(CH_3)NH(CH_2)_3Si(OCH_3)_3$ and (e) $(CH_3)_2N(CH_2)_3Si(OCH_3)_3$, (2) has a Na:Si ratio of about 1:1 and the mole ratio of (1) to (2) is about 1:1.

7. The process of claim 6 wherein the polyolefin is polyethylene, the substrate is Saran coated cellophane and the composition is applied to the substrate as a solution in a mixture of isopropyl alcohol and water.

8. A composition for adhering a polyolefin to a substrate consisting essentially of (1)

$$H_2NCH_2CH_2NH(CH_2)_3Si(OCH_3)_3$$

and (2) $CH_3Si(OCH_3)_3$ in equimolar amounts.

9. A composition for adhering a polyolefin to a substrate consisting essentially of (1)

$$H_2NCH_2CH_2NH(CH_2)_3Si(OCH_3)_3$$

and (2) $C_3H_7Si(OCH_3)_3$ in equimolar amounts.

10. A composition for adhering a polyolefin to a substrate consisting essentially of (1)

$$H_2NCH_2CH_2NH(CH_2)_3Si(OCH_3)_3$$

and (2) $C_6H_5Si(OCH_3)_3$ in equimolar amounts.

11. A composition for adhering a polyolefin to a substrate consisting essentially of (1)

$$H_2NCH_2CH_2NH(CH_2)_3Si(OCH_3)_3$$

and (2) a mixture of $CH_3Si(OCH_3)_3$ and acetic acid, the mole ratio of (1) to the $CH_3Si(OCH_3)_3$ being about 1:1 and the mole ratio of (1) to the acid being about 1:3.

12. A composition consisting essentially of (1) a silane having the general formula $$Y_2N{-}R{-}\overset{R''_a}{\overset{|}{Si}}(OR')_{3-a}$$

wherein:

R is a divalent hydrocarbon radical free of aliphatic unsaturation and containing at least 3 carbon atoms, Y is a member selected from the group consisting of hydrogen atoms, amino-substituted monovalent hydrocarbon groups free of aliphatic unsaturation and monovalent hydrocarbon groups, R′ is a member selected from the group consisting of alkyl groups containing 1 to 4 carbon atoms, and the $-CH_2CH_2OH$, $-CH_2CH_2OCH_3$ and $-CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Y_2N-$ group is attached to at least the third carbon atom removed from the silicon atom, and (2) sodium monomethylsiliconate.

13. The composition of claim 12 wherein (1) is selected from the group consisting of (a) $H_2NCH_2CH_2NH(CH_2)_3Si(OCH_3)_3$ (b) $H_2NCH_2CH_2NHCH_2CH(CH_3)CH_2Si(OCH_3)_3$ and (c) $H_2N(CH_2)_3Si(OC_2H_5)_3$, (2) has a Na:Si ratio of about 1:1 and the mole ratio of (1) to (2) is about 1:1.

14. An article of manufacture comprising at least one layer of a polyolefin bonded to a substrate, there being between the polyolefin and substrate a dried composition consisting essentially of (1) a silane having the general formula $$Y_2N{-}R{-}\overset{R''_a}{\overset{|}{Si}}(OR')_{3-a}$$

wherein:

R is a divalent hydrocarbon radical free of aliphatic unsaturation and containing at least 3 carbon atoms, Y is a member selected from the group consisting of hydrogen atoms, amino-substituted monovalent hydrocarbon groups free of aliphatic unsaturation and monovalent hydrocarbon groups, R′ is a member selected from the group consisting of alkyl groups containing 1 to 4 carbon atoms, and the $-CH_2CH_2OH$, $-CH_2CH_2OCH_3$ and $-CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive, and the $Y_2N-$ group is attached to at least the third carbon atom removed from the silicon atom, and (2) sodium monomethylsiliconate.

15. A composition for adhering a polyolefin through a substrate consisting essentially of a mixture of (1) a silane having the general formula $$Z_2N-R-\overset{\displaystyle R''_a}{\underset{|}{}}\!Si(OR')_{3-a}$$

wherein:

R is a divalent hydrocarbon radical free of aliphatic unsaturation and containing at least 3 carbon atoms, Z is a member selected from the group consisting of hydrogen atoms and substituted monovalent hydrocarbon groups containing at least one $H_2N$-group and being free of aliphatic unsaturation, R′ is a member selected from the group consisting of alkyl groups containing 1 to 4 carbon atoms, and the $-CH_2CH_2OH$, $-CH_2CH_2OCH_3$ and $-CH_2CH_2OCH_2CH_3$ groups, R″ is a member selected from the group consisting of monovalent hydrocarbon groups free of aliphatic unsaturation and fluorinated monovalent hydrocarbon groups free of aliphatic unsaturation in which all of the fluorine atoms are attached to at least the third carbon atom removed from the silicon atom,

*a* is an integer from 0 to 2 inclusive and the $Z_2N$-group is attached to at least the third carbon atom removed from the silicon atom, and (2) a silane having the general formula $R'''Si(OR')_3$ wherein:

R‴ is a member selected from the group consisting of alkyl groups containing 1 to 18 carbon atoms and the phenyl group and R′ is as defined above, the mole ratio of (1) to (2) being in the range of 2:1 to 1:3.

References Cited

UNITED STATES PATENTS

| | | | |
|---|---|---|---|
| 2,828,237 | 3/1958 | Rosser | 156—331 |
| 2,832,754 | 4/1958 | Jex et al. | |
| 2,919,059 | 12/1959 | Sporka. | |
| 3,013,915 | 12/1961 | Morgan. | |
| 3,025,588 | 3/1962 | Eilerman | 161—93 |
| 3,046,155 | 7/1962 | Reinke. | |
| 3,158,519 | 11/1964 | Shannon et al. | 156—335 |
| 3,211,684 | 10/1965 | Eakins | 156—330 |
| 2,688,006 | 8/1954 | Steinman | 156—329 |
| 3,074,904 | 1/1963 | Higashi | 156—329 |
| 3,179,612 | 4/1965 | Plueddemann | 156—329 |

HAROLD ANSHER, Primary Examiner

C. B. COSBY, Assistant Examiner

U.S. Cl. X.R.

156—329; 252—8.8, 137; 260—448.8